United States Patent [19]

Gill et al.

[11] Patent Number: 4,987,509

[45] Date of Patent: Jan. 22, 1991

[54] MAGNETORESISTIVE HEAD STRUCTURES FOR LONGITUDINAL AND PERPENDICULAR TRANSITION DETECTION

[75] Inventors: Hardayal S. Gill, Los Altos; Victor W. Hesterman, Los Altos Hills, both of Calif.

[73] Assignee: Hewlett-Packard Company, Palo Alto, Calif.

[21] Appl. No.: 417,351

[22] Filed: Oct. 5, 1989

[51] Int. Cl.$^5$ ............................................... G11B 5/39
[52] U.S. Cl. .................................................... 360/113
[58] Field of Search ........................ 360/113; 324/252; 338/32 R

[56] References Cited

U.S. PATENT DOCUMENTS 4,356,523  10/1982  Yeh ..................................... 360/113
4,922,360   5/1990  Takano et al. ..................... 360/113

OTHER PUBLICATIONS

C. Tsang, Journal of Applied Physics, vol. 55, No. 6, p. 2226, Mar. 1984.
H. Suyama et al., IEEE Transactions on Magnetics, vol. 24, No. 6, p. 2162, Nov., 1988.

*Primary Examiner*—Robert S. Tupper

[57] ABSTRACT

A magnetoresistive head structure that incorporates a thin film magnetoresistive transducer that is suitable for use in perpendicular and longitudinal recording heads. This structure includes first and second dielectrically separated magnetoresistive members that have noncontacting first ends. Sense conductors are disposed in contact with the first ends of the magnetoresistive members and are adapted to provide sense currents thereto. A bias current conductor arrangement is disposed adjacent to the magnetoresistive members and is separated therefrom by dielectric and is adapted to provide bias current thereto. A common conductor is disposed in contact with the second ends of the magnetoresistive members and is adapted to short the second ends thereof and provide a return path for the sense and bias currents. In one embodiment, the bias conductor arrangement passes between the magnetoresistive members and thus provides for longitudinal transition detection. In another embodiment, the bias conductor arrangement passes adjacent one side of the first magnetoresistive member and returns on the other side of the two magnetoresistive elements and thus provides for perpendicular transition detection. Additionally, a plurality of nonmagnetic shield members may be provided adjacent the magnetoresistive members to magnetically shield them from extraneous magnetic fields and improve resolution. Differential amplification means may also be provided for processing voltages sensed across the magnetoresistive members.

18 Claims, 2 Drawing Sheets

MAGNETORESISTIVE HEAD STRUCTURES FOR LONGITUDINAL AND PERPENDICULAR TRANSITION DETECTION

BACKGROUND

The present invention relates generally to thin film magnetoresistive transducers, and more particularly to a megnetoresistive transducer which is suitable for reproduction of signals recorded in narrow tracks of an associated magnetic recording medium.

Magnetoresistive elements are known to exhibit change in resistivity in response to changes in an externally applied magnetic field. However, when utilized to detect signals recorded on narrow tracks, having a width on the order of 25 μm or less, they suffer from Barkhausen noise due to large demagnetization fields that cause domain wall formation. The latter effects prevent utilization of these magnetoresistive elements in high density narrow track multichannel transducer applications.

Conventional magnetoresistive transducers have sense currents that flow parallel to the easy axis of the magnetoresistive elements, which is parallel to the air bearing surface and perpendicular to the track being read, as described by C. Tsang in *Journal of Applied Physics*, Vol. 55 No. 6, page 2226 (1984). An arrangement was patented by Yeh et al. in U.S. Pat. No. 4,356,523 entitled "Narrow Track Magnetoresistive Transducer Assembly," in which the sense current is oriented perpendicular to the easy axis direction of the magnetoresistive elements and perpendicular to the air bearing surface. H. Suyama et al. published experimental results for this transducer geometry in *IEEE Transactions on Magnetics*, Vol. 24, No. 6, November 1988, that showed very low Barkhausen noise.

The Yeh patent describes a transducer wherein two closely spaced magnetostatically coupled magnetoresistive elements are arranged with their respective planar surfaces in parallel. A nonmagnetic insulating material is interposed between the elements to prevent ferromagnetic exchange coupling. Sense current flows simultaneously through both elements in the same direction and perpendicular to the easy axis of the magnetization. In response to signal fields applied in parallel with the sense current flow, demagnetization components in the easy axis direction cancel. The output signal of the transducer is indicated to be independent of recording track width and free of Barkhausen noise.

The Suyama article indicates that its two laminated magnetoresistive elements provide magnetic flux closure, thus minimizing magnetic pole formation at the edges of the elements and assuring a single domain structure inside the two magnetoresistive elements. This is assured by sense currents that flow in the same direction in the two elements and provide oppositely directed magnetization in the magnetoresistive elements.

SUMMARY OF THE INVENTION

The present invention comprises a magnetoresistive head structure that incorporates a thin film magnetoresistive transducer that is suitable for use in perpendicular and longitudinal recording heads. The long dimension of the two magnetoresistive elements is perpendicular to the air bearing surface, and the easy axis is parallel to the air bearing surface. The magnetoresistive head structure includes first and second magnetoresistive members that are separated by dielectric material and that have noncontacting first ends. The space between the two magnetoresistive elements is minimized, consistent with providing non-shorting insulation between them to assure good magnetic flux closure. Sense current conductors are disposed in contact with the first ends of the magnetoresistive members and are adapted to provide sense currents thereto. A bias current conductor arrangement is disposed adjacent to the magnetoresistive members and is separated therefrom by dielectric and is adapted to provide bias current thereto. A common conductor is disposed in contact with adjacent second ends of the magnetoresistive members and is adapted to electically short the second ends thereof and provide a return path for the sense currents.

In one embodiment, the bias current conductor arrangement passes between the magnetoresistive members and is dielectrically separated therefrom. This arrangement provides for longitudinal transition detection. In another embodiment, the bias conductor arrangement passes adjacent one side of the first magnetoresistive member and then returns on the opposite side of the other magnetoresistive element and is separated therefrom by dielectric. This arrangement provides for perpendicular transition detection. Additionally, a plurality of nonmagnetic shield members may be disposed adjacent the magnetoresistive members that are adapted to produce higher resolution and to magnetically shield the magnetoresistive members from extraneous magnetic fields. The structure of the present invention may further comprise differential amplification means for processing signal voltages sensed by the first and second magnetoresistive members.

The use of separate electrical connections to the two magnetoresistive members and differential detection provides signal enhancement, common mode noise rejection and reduction in second harmonic distortion. The head structure that is adapted to detect perpendicular transitions also provides higher linear resolution.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figures 1A, 1B:
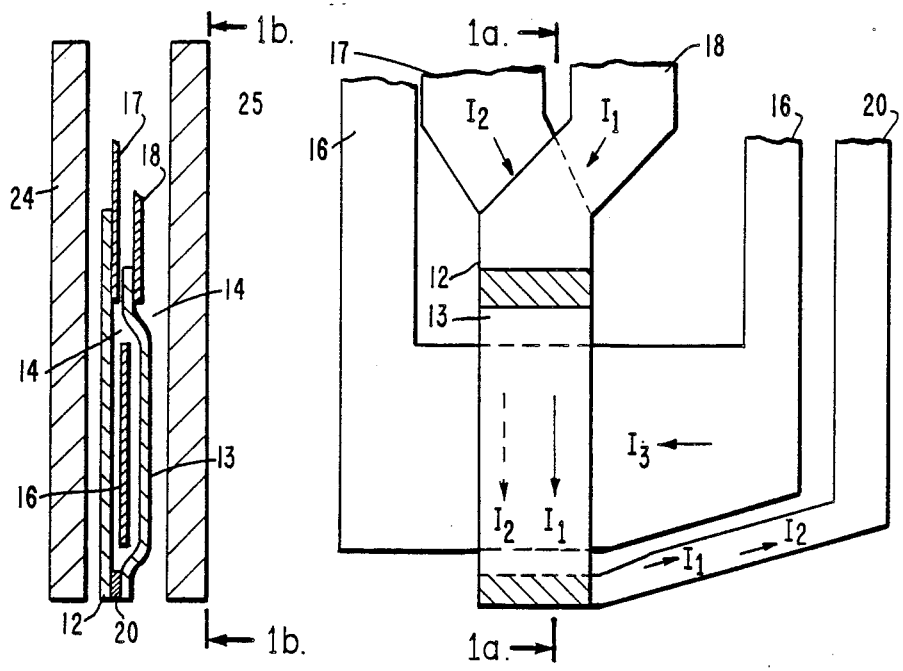
FIGS. 1a and b illustrate edge and planar views, respectively, of a first embodiment of a magnetoresistive recording head structure in accordance with the principles of the present invention that is adapted for use in longitudinal recording.

Referring to FIGS. 1a and b, a first embodiment of a magnetoresistive recording head structure 10a in accordance with the principles of the present invention that is adapted for use in longitudinal recording is shown. FIG. 1a shows and edge view of the structure 10a having the sensing end pointing downward in the drawing figure, and FIG. 1 b shows a planar view of the head structure 10a taken in the direction of the arrows 1b—1b. Nonmagnetic shield members 24, 25 shown in FIG. 1a are not shown for clarity in FIG. 1b. The magnetoresistive recording head structure 10a is comprised of a magnetoresistive transducer that is suitable for use in longitudinal recording heads. The magnetoresistive head structure 10a includes first and second magnetoresistive members 12, 13 that are substantially separated by thin dielectric material 14 and that have adjacent noncontacting first ends, respectively.

First and second sense current conductors 17, 18 are disposed in contact with first ends of the magnetoresistive members 12, 13 that are adapted to provide externally generated sense currents thereto. A common conductor 20 is disposed in electrical contact with the second ends of the magnetoresistive members 12, 13 that is adapted to short the second ends thereof and provide a return path for the sense currents. A bias conductor 16 passes between the magnetoresistive members 12, 13 and is dielectrically separated therefrom. The bias current conductor 16 provides bias current to the magnetoresistive members 12, 13. This biases one magnetoresistive element up and the other down, and provides for longitudinal transition detection in the recording head structure 10a. Additionally, the nonmagnetic shield members 24, 25 are disposed adjacent the magnetoresistive members 12, 13 and are adapted to magnetically shield the magnetoresistive members 12, 13 from extraneous magnetic fields and to produce better resolution of the recorded track.

The magnetoresistive members 12, 13 may be comprised of a suitable magnetic material such as permalloy, for example, while the conductors 17, 18, 20 may be comprised of such metals as gold, gold plated copper or aluminum, for example. The dielectric material 14 separating the magnetoresistive members 12, 13 and the conductors 17, 18, 20 is comprised of silicon dioxide, for example. Typically the magnetoresistive members 12, 13 are about 400 Angstroms thick and are separated by less than 500 Angstroms of dielectric material 14. The sense current and common conductors 17, 18, 20 are typically about 1000 Angstroms thick. The bias conductor 16 is typically 500 Angstroms thick and is separated from the magnetoresistive members 12, 13 by about 500 Angstroms of dielectric material 14.

Figure 2:
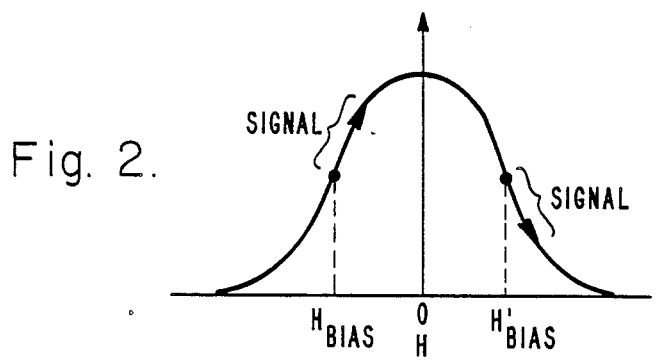
FIG. 2 illustrates a graph representing resistance versus bias fields and sense fields of the magnetoresistive recording head structure of FIG. 1.

The two magnetoresistive members 12, 13 have an easy axis that is oriented perpendicular to the direction of flow of the sense currents passing therethrough. These sense currents provide antiparallel magnetic field biases along the easy axes of the magnetoresistive members 12, 13, and thus assure the achievement of a single domain state. The single domain state is necessary to obtain operation free of Barkhausen noise. The bias conductor 16 is adapted to provide an opposing hard axis bias field to the magnetoresistive members 12, 13. The effect of the hard axis bias field and longitudinal transition signal field on magnetoresistance is shown in FIG. 2. FIG. 2 illustrates a graph representing resistance versus magnetic field of the magnetoresistive recording head structure 10a of FIGS. 1a and b that are sensed by differential amplification means 28 shown in FIG. 3.

Figure 3:
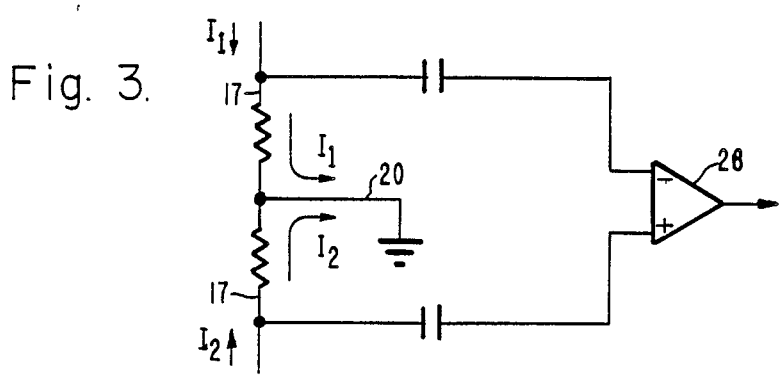
FIG. 3 illustrates a detection arrangement suitable for use with the magnetoresistive recording head structure of FIG. 1.

The magnetoresistive recording head structure 10a of the present invention may further comprise the differential amplification means 28 shown in FIG. 3. The differential amplification means 28 processes voltages sensed by the first and second magnetoresistive members 12, 13. FIG. 3 illustrates a typical detection arrangement incorporating the differential amplification means 28 suitable for use with the magnetoresistive recording head structure 10a and b.

Figures 4A, 4B:
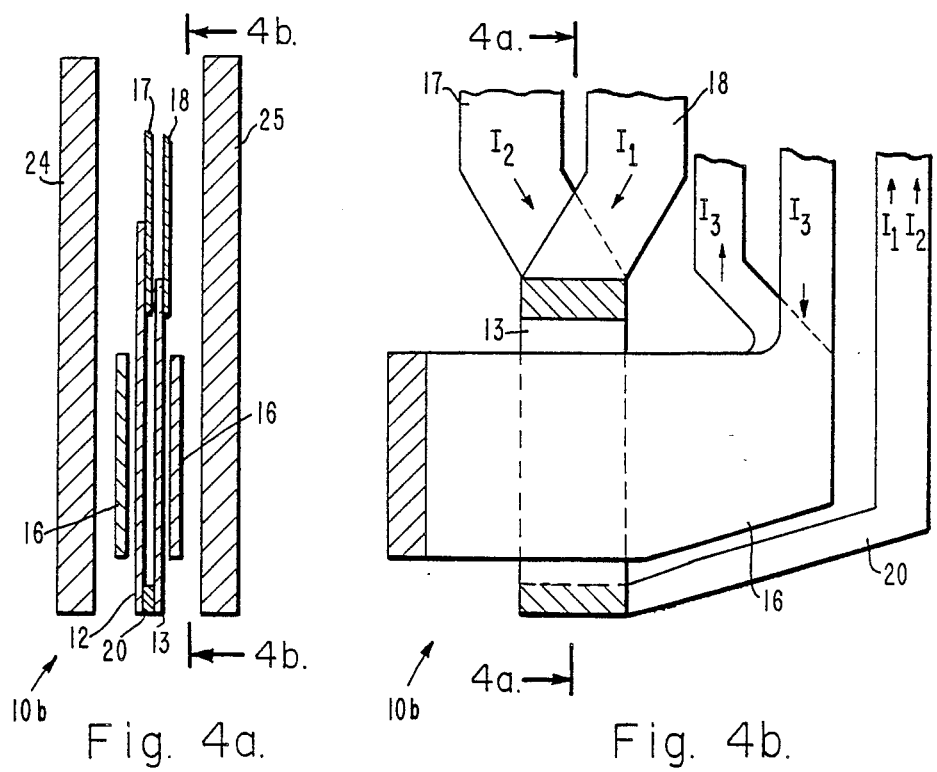
FIGS. 4a and b illustrate side and top views, respectively, of a second embodiment of a magnetoresistive recording head structure in accordance with the principles of the present invention that is adapted for use in perpendicular recording.
Figure 5:
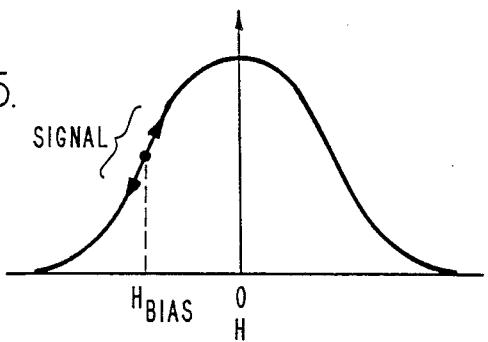
FIG. 5 illustrates a graph representing resistance versus bias fields and sense fields of the magnetoresistive recording head structure of FIG. 4.
Figure 6:
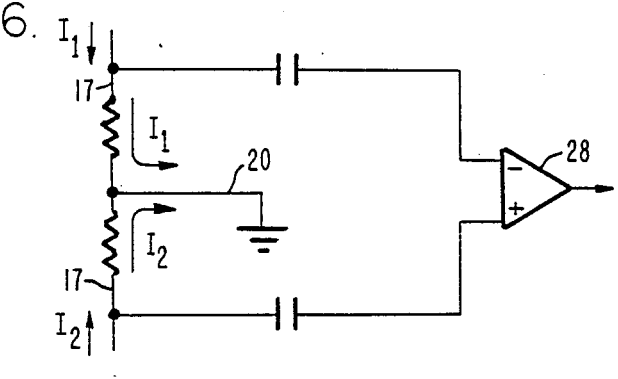
FIG. 6 illustrates a detection arrangement suitable for use with the magnetoresistive recording head structure of FIG. 4.

FIGS. 4a and b illustrates a second embodiment of a magnetoresistive recording head structure 10b in accordance with the principles of the present invention that is adapted for use in perpendicular recording. FIG. 4a shows an edge view of the structure 10b having the sensing end pointing downward in the drawing figure, and FIG. 4b shows a planar view of the head structure 10b taken in the direction of the arrows 4b—4b. The structure 10b is substantially similar to the structure 10a described with reference to FIGS. 1a and b, except that the bias conductor 16 passes adjacent one side of the first magnetoresistive members 12, and then returns on the opposite side of the other magnetoresistive member 13 and is dielectrically separated from both members 12, 13 and from the shield members 24, 25. This operates to bias both magnetoresistive members 12, 13 in the same direction to provide for perpendicular transition detection in the recording head structure 10b. The two magnetoresistive members 12, 13 are not magnetically shorted together at the end comprising an air bearing surface of the head structure 10b. FIG. 5 illustrates a graph representing the resistance versus bias fields and signal fields of the magnetoresistive recording head structure 10b of FIGS. 4a and b. FIG. 6 illustrates a detection arrangement suitable for use with the magnetoresistive recording head structure 10b of FIGS. 4a and b.

In this perpendicular head structure 10b, the bias conductor 16 is not disposed between the two magnetoresistive members 12, 13, but first passes on the outward side of the first magnetoresistive members 12, and then returns on the other side of the second magnetoresistive member 13. This arrangement provides for codirectional hard axis bias fields to the magnetoresistive members 12, 13. The effect of codirectional bias and perpendicular transition centered between the two members 12, 13 on magnetoresistance is shown in FIG. 5. It is to be noted that in this embodiment, the magnetoresistive members 12, 13 are not magnetically shorted together at their second ends, namely at the air bearing surface. The use of separate electrical connections to the two magnetoresistive members 12, 13 and differential detection provides signal enhancement, common mode noise rejection and second harmonic reduction. This second head structure 10b is adapted to detect perpendicular transitions and also provide higher linear resolution.

Thus, new and useful magnetoresistive recording head structures have been described that are adapted to provide for recording and reproduction of both longitudinal and perpendicular transitions in recording media. It is to be understood that the above-described embodiments of the invention are merely illustrative of some of the many possible specific embodiments which represent applications of the principles of the present invention. Clearly, numerous and varied other arrangements can be readily devised in accordance with these principles by those skilled in the art without departing from the scope of the invention.

What is claimed is:

1. A magnetoresistive read head structure comprising:
   first and second magnetoresistive members separated by dielectric material and having adjacent noncontacting first ends;
   first and second sense current conductors coupled to respective first ends of the first and second magnetoresistive members for providing sense current thereto;
   a bias current conductor arrangement disposed adjacent to the first and second magnetoresistive members and dielectrically separated therefrom for providing bias current thereto; and
   a common conductor coupled to the second ends of the magnetoresistive members that elecrically shorts the second ends thereof and provides a return path for the sense currents.

2. The structure of claim 1 which further comprises:
   a plurality of nonmagnetic shield members disposed adjacent the magnetoresistive members for magnetically shielding them from extraneous magnetic fields so as to sense magnetic transitions immediately adjacent the magnetorestive elements, thus providing improved resolution.

3. The structure of claim 1 wherein the second ends of the magnetoresistive members are magnetically shorted together.

4. The structure of claim 2 wherein the second ends of the magnetoresistive members are magnetically shorted together.

5. The structure of claim 1 which further comprises differential amplification means for processing signal voltages produced by the first and second magnetoresistive members.

6. The structure of claim 2 which further comprises differential amplification means for processing signal voltages produced by the megnetoresistive members.

7. The structure of claim 1 wherein the bias conductor arrangement passes between the magnetoresistive members and is dielectrically separated therefrom.

8. The structure of claim 2 wherein the bias conductor arrangement passes between the magnetoresistive members and is dielectrically separated therefrom.

9. The structure of claim 1 wherein the bias conductor arrangement passes adjacent an outward side of one magnetoresistive member and then returns adjacent the outward side of the other magnetorestive member, thus encompassing both magnetorestive members, and the bias conductor arrangement is separated from the magnetoresistive members by dielectric material.

10. The structure of claim 2 wherein the bias conductor arrangement passes adjacent an outward side of one magnetoresistive member and then returns adjacent the outward side of the other magnetorestive member, thus encompassing both magnetorestive members, and the bias conductor arrangement is separated from the magnetoresistive members by dielectric material.

11. A magnetoresistive head structure for reading data from an associated magnetic medium having recording tracks thereon, the structure having one end that is designated an air bearing surface, said head structure comprising:
    first and second magnetoresistive members substantially separated by dielectric material and having adjacent noncontacting first ends, and having easy axes perpendicular to the length of the recording tracks and parallel to the air bearing surface, and having second ends close to the air bearing surface;
    first and second sense current conductors coupled to respective first ends of the first and second magnetoresistive members for providing sense current thereto;
    a bias current conductor arrangement that passed between the magnetoresistive members and is dielectrically separated therefrom; and
    a common conductor coupled to the second ends of the magnetoresistive members which electrically shorts them and provides a return path for the sense currents;
    wherein the sense currents provide opposing easy axis fields to the first and second magnetoresistive members, and the bias current provide opposing fields perpendicular to the easy axis of the first and second magnetorestive members.

12. The structure of claim 11 which further comprises:
    a plurality of nonmagnetic shield members desposed adjacent the magnetoresistive members for magnetically shielding them from extraneous magnetic fields so as to sense magnetic transitions immediately adjacent the magnetorestive elements, thus providing improved resolution.

13. The structure of claim 11 wherein the second ends of the magnetoresistive members are magnetically shorted together.

14. The structure of claim 11 which further comprises differential amplification means for processing signal voltages produced by the first and second magnetoresistive members.

15. A magnetoresistive head structure for reading and writing data from and to an associated magnetic medium having recording tracks thereon, the structure having one end that is designated an air bearing surface, said structure comprising:
    first and second magnetoresistive members substantially separated by dielectric material and having adjacent noncontacting first ends, and having easy axes perpendicular to the length of the track and parallel to the air bearing surface, and having second ends disposed adjacent to the air bearing surface;
    first and second sense current conductors coupled to respective first ends of the first and second magnetoresistive members for providing sense current thereto;
    a common conductor coupled to the second ends of the magnetoresistive members which electrically shorts them and provides a return path for the sense currents;
    a bias conductor arrangement that is dielectrically separated from both magnetoresistive members and that passes on one side of both members and then returns on the opposite side of both members, thus encompassing both members;
    wherein the sense currents provide opposing easy axis fields to the first and second magnetoresistive members, and the bias current provides unidirectional fields perpendicular to the easy axis of the first and second magnetorestive members.

16. The structure of claim 15 which further comprises:
 a plurality of nonmagnetic shield members disposed adjacent the magnetoresistive members for magnetically shielding them from extraneous magnetic fields so as to sense magnetic transitions immediately adjacent the magnetorestive elements, thus providing improved resolution.

17. The structure of claim 15 which further comprises differential amplification means for processing signal voltages produced by the first and second magnetoresistive members.

18. The structure of claim 16 which further comprises differential amplification means for processing signal voltages produced by the magnetoresistive members.

* * * * *